United States Patent [19]

Hiraiwa

[11] Patent Number: 4,526,052
[45] Date of Patent: Jul. 2, 1985

[54] SYNCHROMESH MECHANISM FOR TRANSMISSION

[75] Inventor: Kazuyoshi Hiraiwa, Atsugi, Japan

[73] Assignee: Nissan Motor Company, Ltd., Japan

[21] Appl. No.: 452,902

[22] Filed: Dec. 27, 1982

[30] Foreign Application Priority Data

Feb. 5, 1982 [JP] Japan .................... 57-14018[U]

[51] Int. Cl.³ .............................................. F16H 3/38
[52] U.S. Cl. ................................. 74/339; 192/53 F
[58] Field of Search ...................... 74/339; 192/53 F

[56] References Cited

U.S. PATENT DOCUMENTS

| 1,901,712 | 3/1933 | Christman | 74/339 X |
| 1,901,713 | 3/1933 | Vincent | 74/339 X |
| 4,263,815 | 4/1981 | Ashauer | 74/339 |
| 4,360,094 | 11/1982 | Ikemoto et al. | 74/339 X |

FOREIGN PATENT DOCUMENTS

| 2256363 | 6/1974 | Fed. Rep. of Germany . | |
| 2538780 | 10/1977 | Fed. Rep. of Germany | 192/53 F |
| 2538781 | 10/1977 | Fed. Rep. of Germany | 192/53 F |
| 2048399 | 12/1980 | United Kingdom . | |
| 2085984 | 5/1982 | United Kingdom . | |

Primary Examiner—Lawrence J. Staab
Assistant Examiner—Arthur T. Quiray
Attorney, Agent, or Firm—Leydig, Voit, Osann, Mayer and Holt, Ltd.

[57] ABSTRACT

A synchromesh mechanism is provided with a synchronizing ring unit that consists of a pusher ring, semicircular lever member and friction ring. The lever member exerts a force that is multiplied by the effect of leverage against the friction ring.

8 Claims, 4 Drawing Figures

SYNCHROMESH MECHANISM FOR TRANSMISSION

BACKGROUND OF THE INVENTION

1. Field of the Invention

The present invention relates to synchromesh mechanisms for transmissions and more particularly to the plate-or struct-type for automotive transmissions.

2. Description of the Prior Art

FIG. 1 shows a typical plate-type synchromesh mechanism 10 which consists of a hub 12, sleeve 14, plate 16, insert spring 18, blocking ring 20 and clutch gear 22. The hub 12 is splined to a transmission output shaft 28 and has external teeth. The sleeve 14 surrounds the hub 12 and has internal teeth meshing with the external hub teeth. Three plates or inserts 16 with a ridge running across the middle are centered in the sleeve 14 by a groove 14a around the inside center of the sleeve 14 and accommodated in the peripheral cuts 12a of the hub 12. A circular wire insert spring 18 is placed on each side of the hub 12 and holds the insert 16 outward so its ridge 16a engages the sleeve internal groove 14a, lightly holding the sleeve 14 centered over the hub 12. The outer edge of the sleeve 14 is provided with a groove 14b in which a shifting yoke, though not shown, fits. Changing gears is accomplished by sliding the sleeve 14 from its centered position on the hub 12 until the internal sleeve teeth engage the matching external teeth of the clutch gear 22. The clutch gear 22 is drivingly connected to an input gear 24 or 26 which is in turn connected through a drive clutch to an engine, though not shown in the drawing. The input gear 24 or 26 is rotatable on the output shaft 28 and will freewheel when the drive clutch disengages the engine. The blocking ring 20 is fitted between the sleeve 14 and the matching clutch gear teeth to prevent engagement until synchronization speed. The blocking ring 20 has a cone 20a that constitutes the external portion of a cone-type clutch. The clutch gear 22 has a matching tapered cone 22a that constitutes the internal portion of the cone clutch. The exterior of the blocking ring 20 has teeth that match the internal sleeve teeth and are chamfered at the sleeve side end. Similarly, the external clutch gear teeth are chamfered on the sleeve side. The blocking ring 20 is driven at hub speed by the three inserts 16 that fit into wide slots 20b provided to the hub side end portion of the blocking ring. The slots 20b are wide enough to allow the teeth to misalign by one-half a tooth in each direction.

During a gear shift, the drive clutch disengages the engine. A shifting yoke moves the hub 12 endwise toward the input gear 24 or 26 to be engaged. The insert ridge 16a moves the insert 16 endwise against the blocking ring 20 as the sleeve 14 moves. The insert 16 exerts a force against the blocking ring 20, engaging the cone clutch, i.e., the cones 20a and 22a. This, in turn, pulls the blocking ring 20 as far as the slots 20b will allow in the direction of relative rotation, causing a mismatch of the teeth which effectively blocks engagement while a speed difference exists. When the speeds of the clutch gear 24 or 26 and the sleeve 14 synchronize, the angle of the chamfered teeth causes a slight rotation that aligns the teeth and allows the sleeve 14 to engage the external clutch gear teeth.

In the above synchromesh mechanism, the capacity of the cone clutch should be large enough to assure positive synchronization action. The large capacity of the cone clutch inevitably requires the cones of the clutch to be large-sized either axially or radially, resulting in an increase in overall size of the transmission.

SUMMARY OF THE INVENTION

In accordance with the present invention, there is provided an improved synchromesh mechanism for use in a transmission. The mechanism comprises a hub splined to a transmission output shaft and having external teeth, a sleeve surrounding the hub and having internal teeth meshing with the external sleeve teeth, a clutch gear rotatable together with a transmission input gear and having a cone constituting the internal portion of a cone clutch, a friction ring having a cone constituting the external portion of the cone clutch, and a pusher ring having teeth that match the internal sleeve teeth and drivingly connected to both the friction ring and the hub to rotate together therewith. The driving connection between the hub and the pusher ring is such that the both are limitedly movable in the direction of relative rotation, and the pusher ring is axially movable in response to the axial movement of the sleeve. The mechanism further comprises a lever member that is interposed between the pusher ring and the friction ring and drivingly connected to the pusher ring to rotate together therewith. The lever member is pivotally supported on the input gear so that it pivots in response to the axial movement of the pusher ring and exerts a force that is multiplied by the effect of leverage against the friction ring.

The above structure makes it possible to increase the capacity of a cone clutch of a synchromesh mechanism without substantially increasing the size.

It is accordingly an object of the present invention to provide a synchromesh mechanism for a transmission which makes it possible to increase the capacity of its cone clutch without substantially increasing the size.

It is another object of the present invention to provide a synchromesh mechanism of the above described character which makes it possible to attain assured and positive synchronization action as well as a reduced overall size of a transmission.

BRIEF DESCRIPTION OF THE DRAWINGS

The features and advantages of the synchromesh mechanism according to the present invention will become more clearly appreciated from the following description taken in conjunction with the accompanying drawings, in which.

DESCRIPTION OF THE PREFERRED EMBODIMENT

Figure 1:
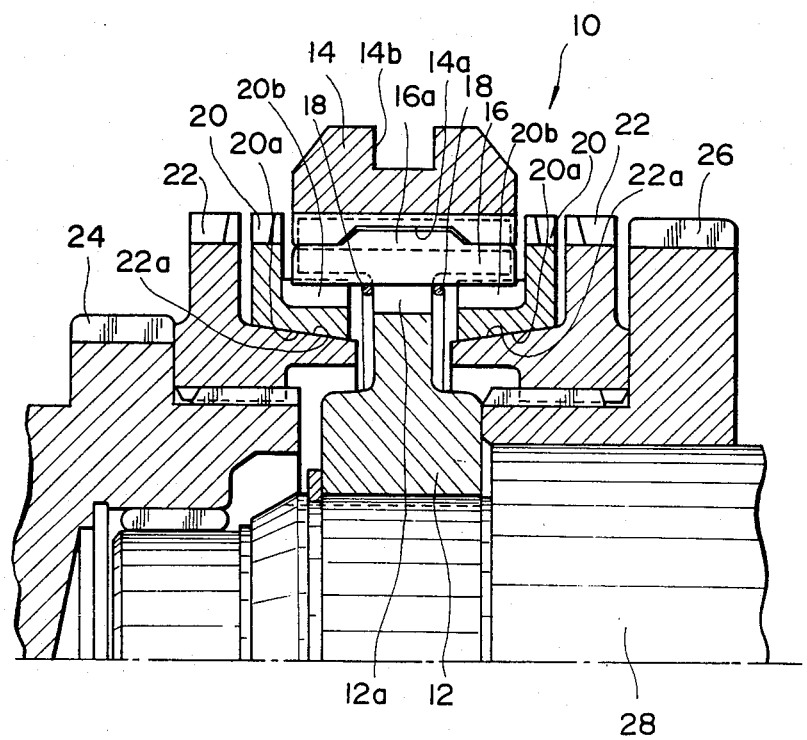
FIG. 1 is a sectional view of a prior art synchromesh mechanism.
Figure 2:
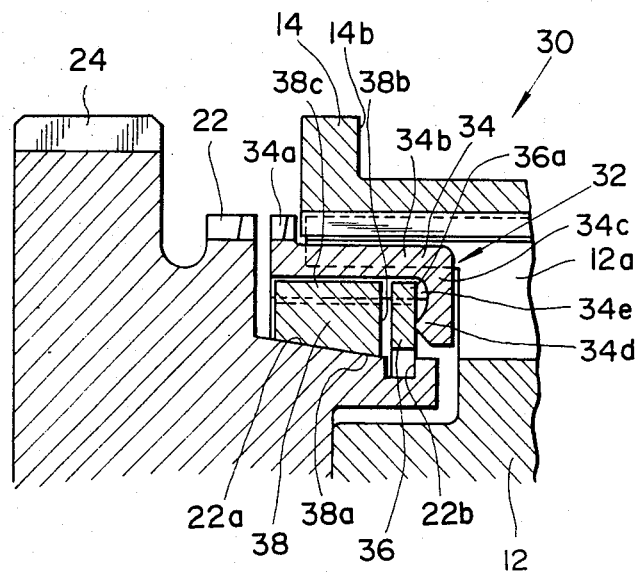
FIG. 2 is a sectional view of a synchromesh mechanism embodying the present invention.
Figure 3:
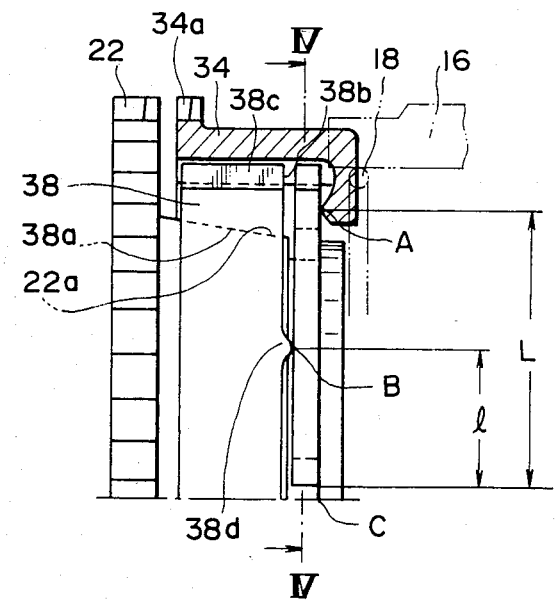
FIG. 3 is a side elevational view, partly in section, of the synchromesh mechanism of FIG. 2, with its hub and sleeve being omitted.
Figure 4:
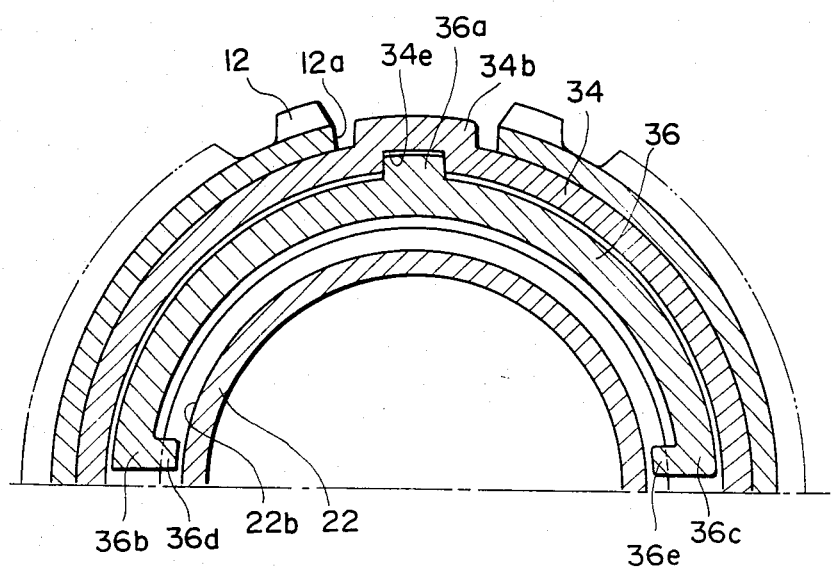
FIG. 4 is a sectional view taken along the line IV—IV of FIG. 3.

Referring now to FIGS. 2-4, inclusive, the synchromesh mechanism of this invention, generally designated by 30, mainly differs from the prior art mechanism 10 of FIG. 1 in that the blocking ring 20 is replaced by a synchronizing ring unit 32 which consists of a pusher ring 34, semicircular lever member 36 and friction ring 38. Other parts of the mechanism 30 are substantially similar to the prior art mechanism of FIG. 1 and indicated by like reference characters as their corresponding parts of FIG. 1.

The pusher ring 34 is drivingly connected to the hub 12 to rotate together therewith and is pushed by the insert 16 to exert a force against the semi-circular lever member 36 which is pivotally installed to effect a lever action, that is, the lever member 36 receives a smaller force from the pusher ring 34 and exerts a larger force against the friction ring 38. The friction ring 38 has a cone 38a which cooperates with the cone 22a of the clutch gear 22 to constitute a cone clutch. In this embodiment, the clutch gear 22 is formed integral with the input gear 24.

More specifically, the pusher ring 34 has an external projection 34b received in the insert accommodation hub cut 12a, and also has, at the input gear side end, external teeth 34a that match the internal sleeve teeth and also has, at the hub side end, an inward arm 34c that has a finger 34d having a rounded end in contact with the lever member 36. The point where the pusher ring 34 is brought into contact with the lever member 36 is designated by A in FIG. 3, and at this point A the pusher ring 34 exerts a force against the lever member 36 when pushed by the insert 16. As shown in FIG. 4, the insert accommodation hub cut 12a is wide enough to allow the pusher ring teeth 34a and the matching sleeve teeth to misalign by one-half a tooth in each direction when a difference in speed exists.

The lever member 36 is semicircular in shape and is received within the pusher ring 34 while partly surrounding the hub side end of the clutch gear 22 integral with the input gear 24. For the driving connection with the pusher ring 34, the lever member 36 is formed with interengaging elements, herein shown as an external projection 36a that fits in an internal groove 34e provided in the pusher ring 34. The external projection 36a is located equidistant from the lateral circumferentially opposed ends 36b and 36c of the lever member 36, and the internal pusher ring groove 34e is located circumferentially coincident with the external projection 34b. At the circumferentially opposed ends 36b and 36c, the lever member 36 has fingers 36d and 36e projecting radially inwardly to fit in a circular groove 22b provided to the hub side end of the clutch gear 22 integral with the input gear 24. The circular clutch gear groove 22b is wide enough to allow the lever member 36 to swing or pivot about the fingers 36d and 36e and therefore about the ends 36b and 36c. The points where the lever member ends 36b and 36c are pivotally supported on the hub side end of the clutch gear 22 are designated by C in FIG. 3. The point C is therefore the fulcrum of the lever member 36.

The friction ring 38 is axially movable on the clutch gear cone 22a and received within the pusher ring 34, with the lever member 36 being placed between the pusher ring arm 34c and a friction ring axial end 38b. Similar to the lever member 36, the friction ring 38 is also provided with an interengaging element such as the external projection 38c that fits in the internal pusher ring groove 34e for the driving connection with the pusher ring 34, the groove 34e, external projection 36a and external projection 38c, comprising means to interengage the pusher ring, lever member and friction ring and thereby permit mutual rotation and axial movement of the member and each of the rings. At the lever member side end 38b, the friction ring 38 is also formed with two axial projections 38d that project axially toward the lever member 36 to contact same. The projections 38d are located so that the external projection 38c is equidistant from the axial projections 38d. The points where the axial projections 38d are brought into contact with the lever member 36 are designated by B in FIG. 3. The point B is determined suitably in view of the desired capacity of the cone clutch, which will be understood when the description proceeds further.

In operation, the sleeve 14 is moved toward the input gear 24 by a shift fork. The pusher ring 34 is pushed by the insert 16 and applies a force on the lever member 36 at the point A. The lever member 36 is caused to swing about the fulcrum C, pushing the friction ring 38 at the projections 38d toward the input gear 24 and allowing the friction ring cone 38a to be pressed against the clutch gear cone 22a.

In this instance, it is to be noted that by the effect of the leverage, the lever member 36 exerts against the friction ring 38 is force that is multiplied L/l times as large as the force applied, where L and l are the distances for the explanation of leverage and respectively designate the distance between the fulcrum C and the point A and the distance between the fulcrum C and the point B as shown in FIG. 3.

When a difference in speed between the sleeve 14 and the input gear 24 exists, the pusher ring 34 is pulled together with the lever member 36 and the friction ring 38 as far as the insert accommodation hub cut 12a will allow in the direction of relative rotation, causing a mismatch of the internal sleeve teeth and the external pusher ring teeth 34a which effectively blocks engagement. When the speed of the input gear 24 is synchronized to that of the sleeve 14, the angle of the chamfered teeth causes a slight rotation of the pusher ring 34 and allows the internal sleeve teeth to engage the external pusher ring teeth 34a. The internal sleeve teeth is then allowed to engage the clutch gear 22, completing a gearshift.

From the foregoing, it will be understood that the present invention makes it possible to increase the capacity of a cone clutch of a synchromesh mechanism without substantially increasing the size. Accordingly, by utilizing the synchromesh mechanism of this invention, a transmission can be made compact in size.

Obviously, numerous modifications and variations of the present invention are possible in light of the above teachings. It is therefore to be understood that within the scope of the appended claims, the invention may be practiced otherwise than as specifically described.

What is claimed is:

1. A synchromesh mechanism for a transmission having an input gear and an output shaft comprising:
   a hub splined to the output shaft of the transmission and having external teeth;
   a sleeve surrounding said hub and having internal teeth meshing with said external hub teeth;
   a clutch gear rotatable together with the input gear of the transmission;
   a cone clutch having a cone rotatable with the input gear;
   a friction ring having a portion thereof shaped complementary to that of said cone clutch;
   a pusher ring having teeth that match said internal sleeve teeth, said pusher ring drivingly connected to said hub in such a manner that the pusher ring and the hub are limitedly movable in the direction of the relative rotation, said pusher ring being axially movable for shifting the cone clutch into an engaged position;

a lever member interposed between said pusher ring and said friction ring and pivotally supported on said input gear so that is pivots in response to the axial movement of said pusher ring and exerts a force operative to press the cone and the complementary shaped portion of said friction ring together, which force is multiplied by the effect of leverage; and means interengaging said friction ring, said lever member and said pusher ring for coupling said lever and said rings for mutual rotation and axial movement comprising external projections on said lever member and said friction ring and an internal groove in said pusher ring.

2. A synchromesh mechanism as set forth in claim 1, in which said lever member is semicircular in configuration and pivots about circumferentially opposed ends thereof.

3. A synchromesh mechanism as set forth in claim 2, in which said pusher ring has at an end thereof said teeth and at the other end thereof an inward arm that cooperates with an end of said friction ring to interpose therebetween said lever member, said inward arm having a finger in contact with said lever member at a point thereon equidistant from said circumferentially opposed ends of the lever member.

4. A synchromesh mechanism as set forth in claim 3 in which said friction ring has at the lever member side end thereof two axial projections projecting axially toward said lever member to contact the lever member at points equidistant from the point at which said finger contacts said lever member.

5. A synchromesh mechanism as set forth in claim 4 in which said pusher ring has in internal groove and in which said lever member is formed with an external projection that fits in said internal pusher ring groove, said external lever member projection being equidistant from said circumferentially opposed ends of said lever member.

6. A synchromesh mechanism as set forth in claim 5 in which said clutch gear has at the hub side thereof a circular groove, and in which said lever member has at the circumferentially opposed ends thereof fingers that project radially inwardly to fit in said circular clutch gear groove, said circular clutch gear groove being wide enough to allow said lever member to pivot about the fingers provided at the ends of said lever member.

7. A synchromesh mechanism as set forth in claim 6, in which said friction ring is formed with an external projection that fits in said internal pusher ring groove and is equidistant from said axial projections.

8. A synchromesh mechanism as set forth in claim 7, in which said hub has a peripheral cut to accommodate therein an insert that exerts a force against said pusher ring in response to the movement of said sleeve, and in which said pusher ring has an external projection received in said external hub cut, said hub cut being wide enough to allow said pusher ring teeth and said matching sleeve teeth to misalign.

* * * * *